United States Patent
Rousseaux et al.

(10) Patent No.: US 10,550,231 B2
(45) Date of Patent: Feb. 4, 2020

(54) MASTERBATCHES FOR PREPARING A COMPOSITE MATERIAL BASED ON SEMI-CRYSTALLINE POLYMER WITH ENHANCED CONDUCTIVITY PROPERTIES, PROCESS AND COMPOSITE MATERIALS PRODUCED THEREFROM

(71) Applicant: Total Research & Technology Feluy, Seneffe (Feluy) (BE)

(72) Inventors: Dimitri Rousseaux, Nivelles (BE); Olivier Lhost, Havre (BE); Philippe Lodefier, Cedex (FR); Eddi Scandino, Feluy (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 73 days.

(21) Appl. No.: 15/557,497

(22) PCT Filed: Mar. 11, 2016

(86) PCT No.: PCT/EP2016/055378
§ 371 (c)(1),
(2) Date: Sep. 12, 2017

(87) PCT Pub. No.: WO2016/142544
PCT Pub. Date: Sep. 15, 2016

(65) Prior Publication Data
US 2018/0044485 A1 Feb. 15, 2018

(30) Foreign Application Priority Data
Mar. 12, 2015 (EP) ..................................... 15158860

(51) Int. Cl.
*H01B 1/24* (2006.01)
*C08K 3/00* (2018.01)
*C08J 3/22* (2006.01)
*C08K 3/04* (2006.01)

(52) U.S. Cl.
CPC .............. *C08J 3/226* (2013.01); *C08K 3/041* (2017.05); *H01B 1/24* (2013.01); *C08J 2323/08* (2013.01); *C08J 2323/12* (2013.01); *C08J 2423/04* (2013.01); *C08J 2423/12* (2013.01); *C08K 2201/001* (2013.01); *C08K 2201/011* (2013.01)

(58) Field of Classification Search
CPC ...... H01B 1/00; H01B 1/18; C08J 3/22; C08J 5/042; C08K 3/00; C08K 3/04
See application file for complete search history.

(56) References Cited

U.S. PATENT DOCUMENTS

| | | | | |
|---|---|---|---|---|
| 8,859,670 | B2* | 10/2014 | Schuessler | C08K 3/04 428/36.9 |
| 2006/0069199 | A1* | 3/2006 | Charati | B82Y 10/00 524/496 |
| 2009/0076195 | A1 | 3/2009 | Nodera et al. | |
| 2009/0209157 | A1* | 8/2009 | Ferrara | B82Y 30/00 442/327 |
| 2010/0127428 | A1* | 5/2010 | Ma | B29C 43/003 264/328.1 |
| 2012/0035327 | A1* | 2/2012 | Ciarafoni | C08L 23/10 525/240 |
| 2013/0119320 | A1* | 5/2013 | Suyama | B82Y 30/00 252/509 |
| 2016/0172071 | A1* | 6/2016 | Rousseaux | C08J 3/226 428/523 |
| 2016/0222180 | A1* | 8/2016 | McLoughlin | C08L 23/12 |

FOREIGN PATENT DOCUMENTS

| | | |
|---|---|---|
| CN | 1654528 A | 8/2005 |
| EP | 2028218 A1 | 2/2009 |
| WO | 2013053948 A1 | 4/2013 |
| WO | 2015014897 A1 | 2/2015 |

OTHER PUBLICATIONS

Search Report and Written Opinion issued in Singapore Application No. 11201707175X, dated Aug. 13, 2018, 12 pages.
International Search Report issued in PCT/EP2016/055378, dated May 24, 2016, 4 pages.

* cited by examiner

*Primary Examiner* — Mark Kopec
(74) *Attorney, Agent, or Firm* — Albert Shung

(57) ABSTRACT

The present invention relates to a masterbatch for use in a process of preparing a composite material comprising a blend of a first semi-crystalline polymer with at least 5 wt % carbon nanotubes. Good dispersion of the carbon nanotube is obtained within the masterbatch and evidenced by the blending of the masterbatch with a second semi-crystalline polymer miscible with the first one in respective proportions to obtain a composite material containing about 1 wt % of carbon nanotubes wherein said composite material yields an agglomerate area fraction U % lower than 2 and a surface resistivity lower than $10^5$ ohm/sq.

5 Claims, No Drawings

MASTERBATCHES FOR PREPARING A COMPOSITE MATERIAL BASED ON SEMI-CRYSTALLINE POLYMER WITH ENHANCED CONDUCTIVITY PROPERTIES, PROCESS AND COMPOSITE MATERIALS PRODUCED THEREFROM

CROSS-REFERENCE TO RELATED APPLICATIONS

This application claims the benefit of PCT/EP2016/055378 filed Mar. 11, 2016, which claims priority from EP 15158860.5 filed Mar. 12, 2015, which are incorporated herein by reference in their entireties for all purposes.

FIELD OF THE INVENTION

The present invention relates to masterbatches for preparing conductive composite materials comprising carbon nanotubes and based on semi-crystalline polymer. The present invention also relates to a process for the preparation of said masterbatches. The present invention also relates to a process for preparing composite materials comprising carbon nanotubes using said masterbatches and to the composite materials produced therefrom.

BACKGROUND OF THE INVENTION

As electronic devices become smaller and faster, their sensitivity to electrostatic charges is increased and electronic packaging has been provided to improve electrostatically dissipative properties. Electronics packaging is designed to prevent the build-up of static electrical charges and the consecutive electrostatic discharge (ESD) which can be responsible of serious damages to sensitive electronics and result in product defects and high scrap rates.

In order to ensure ESD protection, insulating polymers may be rendered conductive or dissipative by incorporating conductive fillers allowing effective dissipation of static electrical charges.

Currently conductive or dissipative plastics are mainly prepared with carbon black which is cheaper than other conductive fillers such as carbon fiber, carbon nanotubes, metal fiber, metal powder or metal-coated carbon fiber. The carbon black content within the material must be sufficiently high so that the carbon black particles create a conductive pathway through the materials. In consequence, high levels of carbon black, e.g. 15-30% are required. Such high levels alter the mechanical properties of the material such as impact strength, elongation, and compound viscosity.

When using other fillers instead of carbon black, these properties need to be preserved at a low content of said fillers to provide a non-costly alternative. Conductive compositions containing carbon nanotubes are known. Production of polymer-CNT composites can be done by physically mixing the polymer powder and the CNT by shear mixing techniques or by grinding. However, an inconvenient of these mixing methods is that the carbon nanotubes are not well dispersed in the polymer since carbon nanotubes tend to form agglomerates within the polymer matrix. These agglomerates induce poor mechanical properties and the need to consider higher CNT content than in the case of well-dispersed CNT. Due to the high cost of CNT, this latter consequence is economically unfavorable.

Another problem encountered with a poor dispersion of the CNT in composite material is that they affect the final aspect of the article made from this material, especially when this article is thin for example when the article is a film. Thus there is a need for composite material comprising a low content of CNT, good electrical properties as well as good dispersion of the CNT and in particular few and little agglomerate of CNT.

It is known from EP2028218 a process for preparing a resin composition comprising blending carbon nanotubes with poly(hydroxyl carboxylic acid) to form a composite and then blending the composite with a polyolefin to form the composition. This document discloses the use of poly (hydroxyl carboxylic acid) as compatibiliser to blend carbon nanotubes into polyolefins.

It is known from WO2015/014897 masterbatches for preparing conductive composites materials comprising carbon nanotubes and produced from amorphous polymers such as polystyrene.

SUMMARY OF THE INVENTION

It is therefore an object of the present invention to provide composite materials based on semi-crystalline polymer, said composite material are electrically conductive or dissipative with low content of CNT and/or with a low agglomerate fraction. Materials having such properties could be obtained by tuning the dispersion of the CNT in the composite materials and therefore optimizing the CNT's network therein. It is also an object of the present invention to provide environmental-friendly materials. It is a further object of the invention to provide articles made from said composite material based on semi-crystalline polymer. It is also an object of the invention to provide suitable masterbatches to produce said composite materials.

According to a first aspect, the present invention provides a masterbatch for use in a process of preparing a composite material. The masterbatch comprises a blend of a first semi-crystalline polymer having a melting temperature Tm1 as measured according to ISO 11357-3:2013, and a melt flow index ranging from 5 to 250 g/10 min measured according to ISO 1133 under a load of 2.16 kg, with carbon nanotubes, the content of carbon nanotubes being of at least 5 wt % based on the total weight of masterbatch as determined according to ISO 11358, preferably from 5 wt % to 25 wt %, more preferably from 5 wt % to 15 wt %; said masterbatch has a high load melt flow index HLMI of from 2 g/10 min to 1000 g/10 min as determined according to ISO 1133 under a load of 21.6 kg.

Still according to the first aspect the invention provides a masterbatch comprising a blend of a first semi-crystalline polymer having a melting temperature Tm1 as measured according to ISO 11357-3:2013, with carbon nanotubes, wherein the carbon nanotubes content is of at least 5 wt % of carbon nanotubes based on the total weight of the masterbatch as determined according to ISO 11358, said masterbatch having a high load melt index (HLMI) of from 2 g/10 min to 1000 g/10 min as determined according to ISO 1133 under a load of 21.6 kg;
remarkable in that when the masterbatch is blended with a second semi-crystalline polymer in respective proportions to obtain a composite material containing from 0.9 wt. % to 1.1 wt %, preferably 1 wt. % of carbon nanotubes with respect to the total weight of said composite material as determined according to ISO 11358, said composite material yields:
 an agglomerate area fraction U % lower than 2%, more preferably lower than 1%, as determined in accordance with ASTM D2663-14, and a surface resistivity lower than $10^5$ ohm/sq, more preferably lower than $10^4$ ohm/sq as determined according to IEC 60167 wherein, the second semi-crystalline polymer is selected to be miscible with the first semi-crystalline polymer, to have a melting temperature Tm2 ranging from Tm1−5° C. to Tm1+5° C. and to have a melt flow index of not more than 20 g/10 min as determined under a load of 2.16 kg according to ISO 1133.

With preference one or more of the following embodiments can be used to define the inventive masterbatch:
- The carbon nanotubes content is ranging from 5 to 25 wt % of carbon nanotubes based on the total weight of the masterbatch as determined according to ISO 11358, preferably from 5 to 15 wt %.
- The masterbatch has a high load melt index (HLMI) ranging from 10 g/10 min to 1000 g/10 min as determined according to ISO1133 under a load of 21.6 kg.
- The first semi-crystalline polymer has a melt flow index (MI2) ranging from 5 to 250 g/10 min as measured according to ISO 1133 under a load of 2.16 kg.
- The first semi-crystalline polymer is polyethylene and its MI2 as well as the HLMI of the masterbatch are measured according to ISO1133 at a temperature of 190° C.
- The first semi-crystalline polymer is polypropylene and its MI2 as well as the HLMI of the masterbach are measured according to ISO 1133 at a temperature of 230° C.
- The masterbatch comprises from 0.01 to 4.0 wt % of one or more additives based on the total weight of the masterbatch, said one or more additives being selected from waxes, tristearin, zinc stearate, magnesium stearate, erucyl amide, oleic acid amide, ethylene acrylic acid copolymer and cetyl trimethyl ammonium bromide.
- The first semi-crystalline polymer is selected from polyethylene, syndiotactic or isotactic polypropylene, polylactic acid, polyamide, ethyl-vinyl acetate, polyurethane, polyetheretherketone, polyoxymethylene, syndiotactic polystyrene (SPS), polyphenylene sulfide (PPS), liquid crystalline polymer (LCP), polybutene, or polyhexene.polyethylene,
- The first semi-crystalline polymer is selected from polyethylene, syndiotactic or isotactic polypropylene, polyamide, ethyl-vinyl acetate, polyurethane, polyetheretherketone, polyoxymethylene, syndiotactic polystyrene (SPS), polyphenylene sulfide (PPS), liquid crystalline polymer (LCP), polybutene, or polyhexene.polyethylene
- The first semi-crystalline polymer is polyethylene and the HLMI of the masterbatch ranges from 10 to 100 g/10 min as determined according to ISO 1133 under a load of 21.6 kg at a temperature of 190° C.
- The first semi-crystalline polymer is syndiotactic or isotactic polypropylene and the HLMI of the masterbatch ranges from 100 to 1000 g/10 min as determined according to ISO 1133 under a load of 21.6 kg at a temperature of 230° C.
- The masterbatch is devoid of poly(hydroxy carboxylic acid)s.

According to a second aspect of the invention, the invention provides for the preparation of a masterbatch as defined above comprising the steps of:
- (a) providing carbon nanotubes,
- (b) providing a first semi-crystalline polymer having a melting temperature Tm1 as measured according to ISO 11357-3:2013, and preferably wherein said first semi-crystalline polymer has a melt flow index comprised between 5 and 250 g/10 min measured according to ISO 1133 under a load of 2.16 kg;
- (c) blending together said carbon nanotubes and said first semi-crystalline polymer by extrusion in an extruder comprising a transport zone and a melting zone maintained at a temperature comprised between Tm1+1° C. and Tm1+50° C., preferably between Tm1+5° C. and Tm1+30° C., and
- (d) forming a masterbatch through a die, said masterbatch comprising at least 5 wt % of carbon nanotubes based on the total weight of the masterbatch as determined according to ISO11358, and having a high load melt index HLMI of from 2 g/10 min to 1000 g/10 min as determined under a load of 21.6 kg according to ISO 1133.

With preference one or more of the following embodiments can be used to define the inventive process:
- The process further comprises the step of blending from 0.01 to 4.0 wt % of one or more additives based on the total weight of the masterbatch with the first semi-crystalline polymer and carbon nanotubes, said one or more additives being selected from waxes, tristearin, zinc stearate, calcium stearate, magnesium stearate, erucyl amide, oleic acid amide, ethylene-acrylic acid copolymer, ethylene vinyl acetate copolymer and cetyl trimethyl ammonium bromide.
- The step (c) of blending together said carbon nanotubes and said first semi-crystalline polymer, is carried out on co-rotating twin screw extruder at a screw speed of at least 300 rpm.
- The first semi-crystalline polymer is polyethylene, the temperature in the transport zone and the melting zone of the extruder ranges from 150° C. to 160° C., and the masterbatch formed has a HLMI preferably ranging from 10 to 100 g/10 min as determined according to ISO 1133 under a load of 21.6 kg at a temperature of 190° C.
- The first semi-crystalline polymer is syndiotactic or isotactic polypropylene, the temperature in the transport zone and the melting zone of the extruder ranges from 155° C. to 175° C., and the masterbatch formed has a HLMI preferably ranging from 100 to 1000 g/10 min as determined according to ISO 1133 under a load of 21.6 kg at a temperature of 230° C.
- The first semi-crystalline polymer consists of a polylactic acid homopolymer and the temperature in the transport zone and the melting zone of the extruder ranges from 182° C. to 195° C., and the masterbatch formed has a HLMI preferably ranging from 1 to 2000 g/10 min as determined according to ISO 1133 under a load of 21.6 kg.

According to a third aspect of the present invention, a composite material comprising a semi-crystalline polymer and carbon nanotubes in an amount ranging from 0.25 to 2.5 wt %, preferably from 0.8 to 1.3 wt % based on the total weight of the composite material as determined according to ISO 11358, remarkable in that the composite material has a surface resistivity lower than $10^5$ ohm/sq, more preferably lower than $10^4$ ohm/sq as determined according to IEC 60167, and has an agglomerate area fraction U % lower than 2.0% preferably lower than 1% as determined in accordance with ASTM D2663-14.

According to a fourth aspect, the invention provides a process for the preparation of a composite material as defined above comprising the steps of:

(a) providing a masterbatch comprising a blend of a first semi-crystalline polymer having a melting temperature Tm1 as measured according to ISO 11357-3:2013, with carbon nanotubes according to the above definition, and prepared with a process as defined above,
(b) providing a second semi-crystalline polymer wherein the second semi-crystalline polymer is selected to be miscible with the first semi-crystalline polymer, to have a melting temperature Tm2 comprised ranging from Tm1−25° C. to Tm1+25° C. and has a melt flow index of not more than 100 g/10 min, preferably not more than 20 g/10 min as determined according to ISO 1133;
(c) blending together said masterbatch and said second semi-crystalline polymer by extrusion in an extruder comprising a transport zone and a melting zone maintained at a temperature greater than 180° C.,
(d) forming a composite material through a die.

With preference the composite material formed in step (d) has:
  a carbon nanotubes contents ranging from 0.25 to 2.5 wt %, preferably from 0.8 to 1.3 wt % based on the total weight of the composite material as determined according to ISO11358,
  a surface resistivity lower than $10^5$ ohm/sq, more preferably lower than $10^4$ ohm/sq as determined according to IEC 60167; and
  an agglomerate area fraction U % lower than 2.0% preferably lower than 1% as determined in accordance with ASTM D2663-14.

According to a fifth aspect, the invention provides an article made of the composite material according to the invention. Preferably, the article is a rotomoulded article made from a composite material according to the present invention preferably comprising from 0.5 wt % to 0.7 wt %, more preferably of 0.6 wt %, of carbon nanotubes based on the total weight of the composite material as determined according to ISO 11358.

DETAILED DESCRIPTION OF THE INVENTION

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

As used herein, the singular forms "a", "an", and "the" include both singular and plural referents unless the context clearly dictates otherwise. By way of example, "a polyethylene" means one polyethylene or more than one polyethylene.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

As used herein, the term "melt blending" involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing. Melt blending may be conducted in machines such as, single or multiple screw extruders, Buss kneader, Eirich mixers, Henschel, helicones, Ross mixer, Banbury, roll mills, molding machines such as injection molding machines, vacuum forming machines, blow molding machines, or the like, or combinations comprising at least one of the foregoing machines. It is generally desirable during melt or solution blending of the composition to impart a specific energy of about 0.01 to about 10 kilowatt-hour/kilogram (kwhr/kg) of the composition. In a preferred embodiment, melt blending is performed in a twin screw extruder, such as a Brabender co-rotating twin screw extruder.

As used herein, the term "masterbatch" refers to concentrates of active material (such as the carbon nanotubes (CNT)) in a polymer, which are intended to be subsequently incorporated into another polymer miscible with the polymer already contained in the masterbatches. Use of masterbatches makes processes more easily adaptable to industrial scale, compared to direct incorporation of CNT powder.

As used herein, the term "miscible" refers to the ability of two polymers to form a single polymeric phase. The term "miscible" is defined herein according to the definition recognized by I.U.P.A.C. which states that two polymers are miscible when $$\left(\frac{\partial^2 \Delta mixG}{\partial \phi^2}\right)T, p > 0,$$

wherein $\Delta_{mix}G$ is the Gibbs energy of mixing and $\phi$ the composition, where $\phi$ is the volume fraction of one of the components determined at its melting temperature (Tm) and under atmospheric pressure.

In accordance with the invention, two polymers are said miscible when they are of the same nature, for instance when both are polyethylene. Two polymers of different nature are in general not miscible with some exception such as for example polypropylene and polybutene.

As used herein, the term "semi-crystalline" indicates a polymer in which some fraction remains un-crystallized or, amorphous when the polymer is cooled to room temperature. In accordance with the invention, a semi-crystalline polymer is a polymer having a degree of crystallinity above 5%, preferably above 10%, as determined according to ASTM D3418-12. The melting temperature of a semi-crystalline polymer can be determined according to ISO 11357-3:2013.

As used therein the terms "polyethylene" (PE) and "ethylene polymer" may be used synonymously. The term "polyethylene" encompasses homopolyethylene as well as copolymer of ethylene which can be derived from ethylene and a comonomer such as one or more selected from the group consisting of $C_3$-$C_{10}$ alpha-olefins, such as 1-butene, 1-propylene, 1-pentene, 1-hexene, 1-octene.

As used therein the terms "polypropylene" (PP) and "propylene polymer" may be used synonymously. The term "polypropylene" encompasses homopolypropylene as well as copolymer of propylene and a comonomer such as one or more selected from the group consisting of ethylene and $C_4$-$C_{10}$ alpha-olefins, such as 1-butene, 1-pentene, 1-hexene, 1-octene. The polypropylene according to the invention can be syndiotactic or isotactic polypropylene. The polypropylene according to the invention can be mono or heterophasic.

In a first aspect of the present invention, a masterbatch for use in a process of preparing a composite material is provided. The masterbatch comprises a blend of a first semi-crystalline polymer having a melting temperature Tm1 as measured according to ISO 11357-3:2013, with carbon nanotubes (CNT), wherein the carbon nanotubes content being of at least 5 wt % of carbon nanotubes based on the total weight of the masterbatch as determined according to ISO 11358, said masterbatch having a high load melt index HLMI ranging from 2 g/10 min to 1000 g/10 min as determined according to ISO 1133 under a load of 21.6 kg.

The temperature at which the HLMI is measured is about Tm1+45° C. This means that the HLMI is determined in accordance with the nature of the first semi-crystalline polymer. For example, when the first semi-crystalline polymer is ethylene, its melting temperature is typically about 135° C. Thus the HLMI of a polyethylene-based masterbatch is measured at 135+45=190° C. which is in accordance with the conditions set for polyethylene in ISO 1133. In another example, when the first semi-crystalline polymer is propylene, its melting temperature is typically about 185° C. Thus the HLMI of a polypropylene-based masterbatch is measured at 185+45=230° C. which is in accordance with the conditions set for polypropylene in ISO 1133.

The masterbatch according to the invention presents a good dispersion of the CNT which can be evidenced when the masterbatch is blended with a second semi-crystalline polymer as we will see later. Indeed, as far as an extrusion process is considered to produce the semi-crystalline polymer based masterbatch, the inventors have determined that the dispersion of the CNT within the composite material obtained by blending a masterbatch and with a second semi-crystalline polymer can be of four different types:

a) The CNT are found in big agglomerates, there are few agglomerates—no electrical properties.
b) The CNT are found in small agglomerates, there are a lot of agglomerates—poor electrical properties.
c) The CNT are found in small agglomerates, there are few agglomerates—good electrical properties due to the fact that a good network of CNT is obtained in the polymeric matrix.
d) The CNT are very well dispersed in the polymeric matrix, there are nearly no agglomerate—poor electrical properties are obtained because the CNT are too dispersed to form a correct network.

The dispersion according to type c) is the one of interest and is the one obtained by the invention. Prior art masterbatches resulted in dispersion of type b). To overcome the poor electrical properties obtained with prior art, the person skilled in the art used to raise the content of CNT in the composite material. The masterbatch according to the invention allows obtaining good electrical properties with a lower content of CNT than in prior art because of the improved dispersion. As it will be demonstrated in the examples, the good dispersion of the CNT is already present in the masterbatch it-self. This is why when the inventive masterbatch and prior art masterbatch are blended with the same second semi-crystalline polymer and in the same condition, the results in terms of agglomerates and electrical properties are different.

Based on this finding, the inventors have worked out a characterization test allowing to differentiate the inventive masterbatch from prior art masterbatchs wherein the targeted dispersion of the CNT is not achieved. In the characterization test a second semi-crystalline polymer is blended with the masterbatch in respective proportions to obtain a composite material containing from 0.9 wt % to 1.1 wt %, preferably 1 wt % of carbon nanotubes with respect to the total weight of said composite material as determined according to ISO 11358. The person skilled in the art knows how to determine the respective proportions.

The second semi-crystalline polymer is to be selected to be miscible with the first semi-crystalline polymer, to have a melting temperature Tm2 ranging from Tm1−5° C. to Tm1+5° C. and to have a melt flow index of not more than 100 g/10 min, preferably of not more than 50 g/10 min and more preferably of not more than 20 g/10 min as determined under a load of 2.16 kg according to ISO 1133. With preference, the first and second semi-crystalline polymer are of the same nature, meaning that for example both are polyethylene or both are polypropylene.

As a result the inventive composite material obtained from the inventive masterbatch yields:
an agglomerate area fraction U % lower than 2%, more preferably lower than 1%, as determined in accordance with ASTM D2663-14, and
a surface resistivity lower than $10^5$ ohm/sq, more preferably lower than $10^4$ ohm/sq as determined according to IEC 60167.

Whereas, dilution of the prior art masterbatch allowed to obtain small agglomerate area fraction or a low resistivity, the dilution of the inventive masterbatch allows to obtain both small agglomerate area fraction and a low resistivity.

In accordance with the invention, the first polymer with a melting temperature Tm1 and the second polymer with a melting temperature Tm2 are chosen so that the melting temperature Tm2 of the second polymer is ranging from Tm1−25° C. to Tm1+25° C., preferably when Tm2 is ranging from Tm1−15° C. to Tm1+15° C., more preferably when Tm2 is ranging from Tm1−5° C. to Tm1+5° C.

The masterbatch according to the present invention allows the preparation of a composite material having a better dispersion of the carbon nanotubes therein. The electrical properties of the resulting composite material are therefore enhanced; in particular the surface resistivity of a composite material is decreased when prepared with the masterbatch according to the present invention. The enhancement of the dispersion (low content of agglomerates within the composite) favors the ease of preparation of shaped article, in particular thin shaped article.

In a preferred embodiment, in the composite material a portion of the carbon nanotubes forms agglomerates within the composite material resulting in an agglomerate area fraction U %. Said agglomerate area fraction U % may be lower than 2.5%, preferably lower than 2.0%, more preferably lower than 1%, even more preferably lower than 0.9%, most preferably lower than 0.8%, even most preferably lower than 0.7%, in particular lower than 0.6% and even more particular lower than 0.5% as determined in accordance with ASTM D2663-14.

In a preferred embodiment, the composite material has a surface resistivity lower than $1 \cdot 10^7$ ohms/sq as determined according to IEC 60167, preferably lower than $1*10^6$ ohm/sq, more preferably lower than $1*10^5$ ohm/sq, most preferably lower than $1*10^4$ ohm/sq, in particular lower than $5*10^3$ ohm/sq. The composite material may have a surface resistivity of at least $1*10^2$ ohm/sq, preferably, of at least $5*10^2$ ohm/sq.

In a preferred embodiment, the second semi-crystalline polymer has a melt flow index of at most 100 g/10 min, preferably at most 60 g/10 min as determined according to ISO 1133.

In a preferred embodiment the first and the second polymer as of the same nature, preferably they are both polyethylene, or they are both polypropylene.

In a preferred embodiment, the carbon nanotubes content ranges from 5 wt % to 25 wt %, preferably from 5 wt % to 15 wt % based on the total weight of the masterbatch as determined according to ISO 11358.

Preferably, the first semi-crystalline polymer has a melt flow index ranging from 5 to 250 g/10 min as measured according to ISO 1133 under a load of 2.16 kg, preferably from 5 to 200 g/10 min, more preferably from 5 to 100 g/10 min. The melt flow index is measured at the same temperature that one used for the measurement of the HLMI of the masterbatch as the same polymer is concerned.

In a preferred embodiment, in addition to the above-specified carbon nanotubes content, the masterbatch comprises from 0.001 to 10 wt %, preferably from 0.01 to 8 wt %, more preferably from 0.01 to 4.0 wt %, of one or more additives based on the total weight of the masterbatch, said one or more additives being selected from waxes, tristearin, zinc stearate, calcium stearate, magnesium stearate, erucyl amide, oleic acid amide, ethylene-acrylic acid copolymer, ethylene vinyl acetate copolymer and cetyl trimethyl ammonium bromide.

In a preferred embodiment, first semi-crystalline polymer is selected from polyethylene, syndiotactic or isotactic polypropylene, polylactic acid, polyamide, ethyl-vinyl acetate, polyurethane, polyetheretherketone, polyoxymethylene, syndiotactic polystyrene (SPS), polyphenylene sulfide (PPS), liquid crystalline polymer (LCP), polybutene, or polyhexene.

Preferably, said first semi-crystalline polymer is selected from:
 (a) a homopolymer of polyethylene, a homopolymer of syndiotactic or isotactic polypropylene, a homopolymer of polylactic acid, a homopolymer of polybutene, or a homopolymer of polyhexene, or
 (b) a copolymer of ethylene with $C_3$-$C_{10}$ olefins, a copolymer of propylene with ethylene or $C_4$-$C_{10}$ olefins, an impact copolymer of propylene, a copolymer of butene, or a copolymer of hexene.

In a preferred embodiment, the first semi-crystalline polymer consists of either:
 (a) a polyethylene homopolymer or a copolymer of ethylene with $C_3$-$C_{10}$ olefins, and the HLMI of the masterbatch ranges from 10 to 100 g/10 min; or
 (b) a syndiotactic or isotactic polypropylene homopolymer or a copolymer of propylene with ethylene or $C_4$-$C_{10}$ olefins and the HLMI of the masterbatch ranges from 100 to 1000 g/10 min; or
 (c) a polylactic acid and the HLMI of the masterbatch ranges from 1 to 2000 g/10 min.

In a preferred embodiment, the high load melt flow index of the second semi-crystalline polymer is greater than 1 g/10 min determined according to ISO 1133; preferably the high load melt flow index is at most 1000 g/10 min, more preferably ranges from 1 to 500 g/10 min.

In a preferred embodiment, the second semi-crystalline polymer is selected from polyethylene, syndiotactic or isotactic polypropylene, polylactic acid, polyamide, ethyl-vinyl acetate, polyurethane, polyetheretherketone, polyoxymethylene, syndiotactic polystyrene (SPS), polyphenylene sulfide (PPS), liquid crystalline polymer (LCP), polybutene, or polyhexene.

Preferably, said second semi-crystalline polymer is selected from:
 (a) a homopolymer of polyethylene, a homopolymer of syndiotactic or isotactic polypropylene, a homopolymer of polylactic acid, a homopolymer of polybutene, or a homopolymer of polyhexene, or
 (b) a copolymer of ethylene with $C_3$-$C_{10}$ olefins, a copolymer of propylene with ethylene or $C_4$-$C_{10}$ olefins, an impact copolymer of propylene, a copolymer of butene, or a copolymer of hexene.

It is understood that the first semi-crystalline polymer of the masterbatch is also the first semi-crystalline polymer of the composite material. The other polymer in which the masterbatch is subsequently incorporated is the second semi-crystalline polymer. Thus, the process of preparing said masterbatch and the process of preparing the composite material include the definitions of the first semi-crystalline polymer and the second semi-crystalline polymer given in the description of the composite material and of the masterbatch and vice-versa.

Suitable carbon nanotubes used in the present invention can generally be characterized by having a size from 1 nm to 5 μm, this definition of size can be limited to two dimensions only, i.e. the third may be outside of these limits.

Suitable carbon nanotubes also referred to as "nanotubes" herein, can be cylindrical in shape and structurally related to fullerenes, an example of which is Buckminster fullerene ($C_{60}$). Suitable carbon nanotubes may be open or capped at their ends. The end cap may for example be a Buckminster-type fullerene hemisphere. Suitable carbon nanotubes used in the present invention can comprise more than 90%, more preferably more than 95%, even more preferably more than 99% and most preferably more than 99.9% of their total weight in carbon. However, minor amounts of other atoms may also be present.

Suitable carbon nanotubes to be used in the present invention can be prepared by any method known in the art. They can be prepared by the catalyst decomposition of hydrocarbons, a technique that is called Catalytic Carbon Vapor Deposition (CCVD). Other methods for preparing carbon nanotubes include the arc-discharge method, the plasma decomposition of hydrocarbons or the pyrolysis of selected polyolefin under selected oxidative conditions. The starting hydrocarbons can be acetylene, ethylene, butane, propane, ethane, methane or any other gaseous or volatile carbon-containing compound. The catalyst, if present, is used in either pure or in supported form. The presence of a support greatly improves the selectivity of the catalysts but it contaminates the carbon nanotubes with support particles, in addition to the soot and amorphous carbon prepared during pyrolysis. Purification can remove these by-products and impurities. This can be carried out according to the following two steps:

1) the dissolution of the support particles, typically carried out with an appropriate agent that depends upon the nature of the support and 2) the removal of the pyrolytic carbon component, typically based on either oxidation or reduction processes.

Nanotubes can exist as single-walled nanotubes (SWNT) and multi-walled nanotubes (MWNT), i.e. nanotubes having one single wall and nanotubes having more than one wall, respectively. In single-walled nanotubes a one atom thick sheet of atoms, for example a one atom thick sheet of graphite (also called graphene), is rolled seamlessly to form a cylinder. Multi-walled nanotubes consist of a number of such cylinders arranged concentrically. The arrangement in a multi-walled nanotube can be described by the so-called Russian doll model, wherein a larger doll opens to reveal a smaller doll.

In an embodiment, the nanotubes are multi-walled carbon nanotubes, more preferably multi-walled carbon nanotubes having on average from 5 to 15 walls.

Nanotubes, irrespectively of whether they are single-walled or multi-walled, may be characterized by their outer diameter or by their length or by both.

Single-walled nanotubes are preferably characterized by a diameter of at least 0.5 nm, more preferably of at least 1 nm, and most preferably of at least 2 nm. Preferably their diameter is at most 50 nm, more preferably at most 30 nm and most preferably at most 10 nm. Preferably, the length of single-walled nanotubes is at least 0.05 μm, more preferably at least 0.1 μm. Preferably, their length is at most 50 mm, more preferably at most 25 mm.

Multi-walled nanotubes are preferably characterized by an outer diameter of at least 1 nm, more preferably of at least 2 nm, 4 nm, 6 nm or 8 nm, and most preferably of at least 9 nm. The preferred outer diameter is at most 100 nm, more preferably at most 80 nm, 60 nm or 40 nm, and most preferably at most 20 nm. Most preferably, the outer diameter is in the range from 9 nm to 20 nm. The preferred length of the multi-walled nanotubes is at least 50 nm, more preferably at least 75 nm, and most preferably at least 100 nm. Their preferred length is at most 500 μm, more preferably at most 100 μm. The most preferred length is in the range from 100 nm to 10 μm. In an embodiment, the multi-walled carbon nanotubes have an average outer diameter in the range from 9 nm to 20 nm or an average length in the range from 100 nm to 10 μm or both.

Preferred carbon nanotubes are carbon nanotubes having a surface area of 200-400 m$^2$/g (measured by BET method).

Preferred carbon nanotubes are carbon nanotubes having a mean number of 5-15 walls.

Non-limiting examples of commercially available multi-walled carbon nanotubes are Graphistrength™ 100, available from Arkema, Nanocyl™ NC 7000 available from Nanocyl, FloTube™ 9000 available from CNano Technology.

In an embodiment, the composition comprises an antioxidant. The antioxidant will be added when preparing the masterbatch or when using the masterbatch to blended with a second semi-crystalline polymer and preferably in both pelletization steps. Suitable antioxidants include, for example, phenolic antioxidants such as pentaerythritol tetrakis[3-(3',5'-di-tert-butyl-4'-hydroxyphenyl)propionate] (herein referred to as Irganox 1010), tris(2,4-ditert-butylphenyl) phosphite (herein referred to as Irgafos 168), 3DL-alpha-tocopherol, 2,6-di-tert-butyl-4-methylphenol, dibutyl-hydroxyphenylpropionic acid stearyl ester, 3,5-di-tert-butyl-4-hydroxyhydrocinnamic acid, 2,2'-methylenebis(6-tert-butyl-4-methyl-phenol), hexamethylene bis[3-(3,5-di-tert-butyl-4-hydroxyphenyl)propionate], benzenepropanamide, N,N'-1,6-hexanediyl bis[3,5-bis(1,1-dimethylethyl)-4-hydroxy] (Antioxidant 1098), Diethyl 3.5-Di-Tert-Butyl-4-Hydroxybenzyl Phosphonate, Calcium bis[monoethyl(3,5-di-tert-butyl-4-hydroxylbenzyl)phosphonate], Triethylene glycol bis(3-tert-butyl-4-hydroxy-5-methylphenyl)propionate (Antioxidant 245), 6,6'-di-tert-butyl-4,4'-butylidenedi-m-cresol, 3,9-bis(2-(3-(3-tert-butyl-4-hydroxy-5-methylphenyl)propionyloxy-1,1-dimethylethyl)-2,4,8,10-tetraoxaspiro[5.5]undecane, 1,3,5-trimethyl-2,4,6-tris(3,5-di-tert-butyl-4-hydroxybenzypenzene, 1,1,3-tris(2-methyl-4-hydroxy-5-tert-butylphenyl)butane, (2,4,6-trioxo-1,3,5-triazine-1,3,5(2H,4H,6H)-triyl)triethylene tris[3-(3,5-di-tert-butyl-4-hydroxyphenyl)propionate], tris(3,5-di-tert-butyl-4-hydroxybenzyl) isocyanurate, Tris(4-tert-butyl-3-hydroxy-2,6-dimethylbenzyl) isocyanurate, ethylene bis[3,3-bis(3-tert-butyl-4-hydroxyphenyl)butyrate], and 2,6-bis[[3-(1,1-dimethylethyl)-2-hydroxy-5-methylphenyl]octahydro-4,7-methano-1H-indenyl]-4-methyl-phenol. Suitable antioxidants also include, for example, phenolic antioxidants with dual functionality such 4,4'-Thio-bis(6-tert-butyl-m-methyl phenol) (Antioxidant 300), 2,2'-Sulfanediylbis(6-tert-butyl-4-methylphenol) (Antioxidant 2246-S), 2-Methyl-4,6-bis(octylsulfanylmethyl)phenol, thiodiethylene bis[3-(3,5-di-tert-butyl-4-hydroxyphenyl)propionate], 2,6-di-tert-butyl-4-(4,6-bis(octylthio)-1,3,5-triazin-2-ylamino)phenol, N-(4-hydroxyphenyl)stearamide, bis(1,2,2,6,6-pentamethyl-4-piperidyl) [[3,5-bis(1,1-dimethylethyl)-4-hydroxyphenyl]methyl]butylmalonate, 2,4-di-tert-butylphenyl 3,5-di-tert-butyl-4-hydroxybenzoate, hexadecyl 3,5-di-tert-butyl-4-hydroxybenzoate, 2-(1,1-dimethylethyl)-6-[[3-(1,1-dimethylethyl)-2-hydroxy-5-methylphenyl] methyl]-4-methylphenyl acrylate, and CAS nr. 128961-68-2 (Sumilizer GS). Suitable antioxidants also include, for example, aminic antioxidants such as N-phenyl-2-naphthylamine, poly(1,2-dihydro-2,2,4-trimethyl-quinoline), N-isopropyl-N'-phenyl-p-phenylenediamine, N-Phenyl-1-naphthylamine, CAS nr. 68411-46-1 (Antioxidant 5057), and 4,4-bis(alpha,alpha-dimethylbenzyl)diphenylamine (Antioxidant KY 405). Preferably, the antioxidant is selected from pentaerythritol tetrakis[3-(3',5'-di-tert-butyl-4'-hydroxyphenyl)propionate] (herein referred to as Irganox 1010), tris(2,4-ditert-butylphenyl) phosphite (herein referred to as Irgafos 168), or a mixture thereof.

In a second aspect of the present invention, a process for the preparation of the masterbatch according to the present invention is provided. Said process comprises the steps of:
 (a) providing carbon nanotubes,
 (b) providing a first semi-crystalline polymer having a melting temperature, Tm1, measured according to ISO 11357-3:2013, and wherein said first semi-crystalline polymer has a melt flow index preferably comprised between 5 and 250 g/10 min measured according to ISO 1133 under a load of 2.16 kg,
 (c) blending together said carbon nanotubes and said first semi-crystalline polymer by extrusion in an extruder comprising a transport zone and a melting zone maintained at a temperature comprised between Tm1+1° C. and Tm1+50° C., preferably between Tm1+5° C. and Tm1+30° C., and
 (d) forming a masterbatch through a die, said masterbatch, comprising at least 5 wt % of carbon nanotubes, preferably from 5 wt % to 25 wt %, more preferably from 5 wt % to 15 wt % based on the total weight of the masterbatch as determined according to ISO 11358, and having a high load melt index, HLMI, of from 2 g/10 min to 1000 g/10 min, preferably ranging from 10 to 1000 g/10 min, determined under a load of 21.6 kg according to ISO 1133.

In a preferred embodiment, the process further comprises the step of blending from 0.001 to 10 wt. %, preferably from 0.01 to 8 wt. %, more preferably from 0.01 to 4.0 wt. % of one or more additives based on the total weight of the masterbatch, with the first semi-crystalline polymer and the carbone nanotubes in step (c).

Preferably said one or more additives being selected from waxes, tristearin, zinc stearate, calcium stearate, magnesium stearate, erucyl amide, oleic acid amide, ethylene-acrylic acid copolymer, ethylene vinyl acetate copolymer and cetyl trimethyl ammonium bromide.

In a preferred embodiment, step (c) is carried out on co-rotating twin screw extruder at a screw speed of at least 300 rpm, preferably at least 500 rpm.

In a preferred embodiment, the temperature of the masterbatch at the extruder's outlet ranges from the crystallization temperature and the melting temperature of the masterbatch polymer.

In a preferred embodiment, the first semi-crystalline polymer is a polyethylene homopolymer or a copolymer of ethylene with $C_3$-$C_{10}$ olefins; and the temperature within the transport and melting zone of the extruder, preferably over the entire length of the extruder, ranges from 140° C. to 180° C., preferably from 140° C. to 170° C., more preferably from 140° C. to 160° C., most preferably from 150° C. to 160° C. Preferably, the temperature of the masterbatch at the extruder's outlet may range from the crystallization temperature and the melting temperature of the polyethylene homopolymer or of the copolymer of ethylene with $C_3$-$C_{10}$ olefins.

Alternatively, the first semi-crystalline polymer is a syndiotactic or isotactic polypropylene homopolymer or a copolymer of propylene with ethylene or $C_4$-$C_{10}$ olefins; and the temperature within the transport and melting zone of the extruder ranges from 155° C. to 195° C., preferably from 155° C. to 185° C., more preferably from 155° C. to 175° C. Preferably, the temperature of the masterbatch at the extruder's outlet may range from the crystallization temperature and the melting temperature of the syndiotactic or isotactic polypropylene homopolymer or of the copolymer of propylene with ethylene or $C_4$-$C_{10}$ olefins used as first semi-crystalline polymer.

Alternatively, the first semi-crystalline polymer is a polylactic homopolymer acid and the temperature within the transport and melting zone of the extruder ranges from 180° C. to 210° C., preferably from 182° C. to 195° C. Preferably, the temperature of the masterbatch at the extruder's outlet may range from the crystallization temperature and the melting temperature of the polylactic acid homopolymer.

In a third aspect of the present invention, a composite material is provided; the composite material being obtained by the blending of the inventive masterbatch together with the second semi-crystalline polymer.

In a preferred embodiment the composite material has a carbon nanotubes content ranging from 0.7 to 1.5 wt %, preferably from 0.8 to 1.3 wt % based on the total weight of the composite material as determined according to ISO 11358, In a preferred embodiment, the composite material has a surface resistivity lower than $1 \cdot 10^7$ ohms/sq as determined according to IEC 60167, preferably lower than $1*10^6$ ohm/sq, more preferably lower than $1*10^5$ ohm/sq, most preferably lower than $1*10^4$ ohm/sq, in particular lower than $5*10^3$ ohm/sq. The composite material may have a surface resistivity of at least $1*10^2$ ohm/sq, preferably, of at least $5*10^2$ ohm/sq as determined according to IEC 60167.

In a preferred embodiment, a portion of said carbon nanotubes forms agglomerates in the composite material resulting in an agglomerate area fraction U % lower than 2.0% as determined in accordance with ASTM D2663-14, preferably lower than 1%, more preferably lower than 0.9%, even more preferably lower than 0.8%, most preferably lower than 0.7%, in particular lower than 0.6% and even more particular lower than 0.5%.

In a preferred embodiment, the composite material has a volatile organic compounds content lower than 100 ppm, preferably lower than 50 ppm measured according to ISO 11890. The composite material according to the present invention shows low content of volatile organic compounds. This is due to the particular process of preparing the masterbatch used in the preparation of said composite material. This is of particular interest to provide environmental friendly articles with no or low emissivity of volatile compounds. Masterbatch of the prior art are usually prepared in presence of organic solvents. Residues of solvent are therefore released by this type of masterbatch of the prior art during subsequent process steps.

The first semi-crystalline polymer and the second semi-crystalline polymer are disclosed above with regard to the masterbatch and the preparation thereof.

In another aspect of the present invention, a process for the preparation of a composite material according to the present invention is provided. The process comprises the steps of:

(a) providing a masterbatch comprising a blend of a semi-crystalline polymer having a melting temperature Tm1 as measured according to ISO 11357-3:2013 with carbon nanotubes, the masterbatch being according to the present invention, and prepared with a process according to the present invention, (b) providing a second semi-crystalline polymer, wherein the second semi-crystalline polymer is selected to be miscible with the first semi-crystalline polymer, and to have a melting temperature Tm2 ranging from Tm1−25° C. to Tm1+25° C., preferably ranging from Tm1−10° C. to Tm1+10° C., more preferably ranging from Tm1−5° C. to Tm1+5° C., and has a melt flow index lower than the melt flow index of the first semi-crystalline polymer, preferably of not more than 100 g/10 min, preferably not more than 20 g/10 min as determined according to ISO 1133;

(c) blending together said masterbatch and said second semi-crystalline polymer by extrusion in an extruder comprising a transport zone and a melting zone maintained at a temperature greater than 180° C.

(d) forming a composite material through a die.

In an embodiment of the invention, the transport zone and the melting zone are maintained at a temperature greater than 180° C. when the first and second polymer are polylactic acid.

In another embodiment, the transport zone and a melting zone maintained at a temperature greater than 200° C. when the first and second polymer are polypropylene or polyethylene.

In an embodiment of the invention, the first and the second semi-crystalline polymer are chosen so that the melt flow index of the first semi-crystalline polymer has a value of at least twice the value of the melt-flow index of the second semi-crystalline polymer.

In another aspect of the present invention, an article made of the composite material according to the present invention is provided. In a preferred embodiment, said composite material is prepared according to the above aspect of the present invention. The article is a sheet, a film, a container, a pipe or a fiber. Preferably, the article is a monolayered sheet or film made of the composite material according to the invention or a multilayered sheet or film comprising at least two coextruded layers of different material wherein at least one of the layer is made of a composite material according to the invention.

The composite material according to the present invention is also used to make an article in a process selected from extrusion, blow-moulding, injection, rotomoulding or injection blow moulding.

Article made from the composite material may be commonly used in material-handling and electronic devices such as packaging film, sheets and thermoformed objects thereform, chip carriers, computers, printers and photocopier components where electrostatic dissipation or electromagnetic shielding are important requirements. Preferably, the formed article comprises packaging. Preferably, the formed article comprises electronics packaging.

In particular, an article obtained by rotomoulding a composite material according to the present invention comprising from 0.5 wt % to 0.7 wt %, preferably of 0.6 wt %, of carbon nanotubes based on the total weight of the composite material as determined according to ISO 11358, is provided.

The present invention can be further illustrated by the following examples, although it will be understood that these examples are included merely for purposes of illustration and are not intended to limit the scope of the invention unless otherwise specifically indicated.

EXAMPLES

For the carbon nanotubes (CNT), multi-walled carbon nanotubes Nanocyl™ NC 7000, commercially available from Nanocyl, were used. These nanotubes have a surface area of 250-300 m$^2$/g (measured by BET method), a carbon purity of about 90% by weight (measured by thermal gravimetric analysis), an average diameter of 9.5 nm and an average length of 1.5 µm (as measured by transmission electron microscopy).

The content of carbon nanotubes in % by weight in blends (% CNT) was determined by thermal gravimetric analysis (TGA) according to ISO11358-1:2014, using a Mettler Toledo STAR TGA/DSC 1 apparatus. Prior to the determination of the content of carbon nanotubes in % by weight in blends (% CNT), the carbon content of the carbon nanotubes in % by weight (% C-CNT) was determined: 2 to 3 milligrams of carbon nanotubes were placed into a TGA. The material was heated at a rate of 20° C./min from 30° C. to 600° C. in nitrogen (100 ml/min). At 600° C., the gas was switched to air (100 ml/min), and the carbon oxidized, yielding the carbon content of the carbon nanotubes in % by weight (% C-CNT). The % C-CNT value was the average of 3 measurements. For the content of carbon nanotubes % by weight in blends (% CNT), 10 to 20 milligrams of sample was placed into a TGA. The material was heated at a rate of 20° C./min from 30° C. to 600° C. in nitrogen (100 ml/min). At 600° C., the gas was switched to air (100 ml/min), and the carbon oxidized, yielding to the carbon content of carbon nanotubes in the sample (% C-sample). The % C-sample value was the average of 3 measurements. The content of carbon nanotubes % by weight in sample (% CNT) was then determined by dividing the carbon content of carbon nanotubes % by weight in samples (% C-sample) by the carbon content of the carbon nanotubes in % by weight (% C-CNT) and multiplying by 100.

% CNT=% C-sample/% C-CNT*100

The surface resistivity (SR) of the blend was measured using a 2410 SourceMeter® apparatus. Conditions which were used were similar to those described in the IEC 60167 and NF C26-215 test methods. The surface resistivity (SR) was measured on 2 mm thick compression molded plaque at 200° C. The resistance measurement was performed using an electrode system made of two conductive paint lines using silver ink and an adhesive mask presenting 2 parallel slits 25 mm long, 1 mm wide and 2 mm apart. The samples were conditioned at 23° C./50% RH for minimum 4 hours before running the test. The measure of the resistance in ohm was reported to a square measurement area and expressed in ohm/square using the following equation: SR=(R×L)/d, wherein: SR is the average resistance reported to a square measurement area, conventionally called surface resistivity (expressed in ohm/sq), R is the average of the resistance measurements (ohm), L is the paint line length (cm), d is the distance between the electrodes (cm). L=2.5 cm and d=0.2 cm and SR=R×12.5. The surface resistivity (SR) value was the average of 3 measurements.

The melt flow index (MFI) is the weight of polymer melt flowing out from a standard die at a given temperature and with a standard weight applied to the piston, which pushing the sample. The MFI was determined under a load of 2.16 kg at a temperature being equal or greater than the melting temperature of said polymer+45° C., based on procedures according to ISO 1133 (under a load of 2.16 kg at a temperature of at least Tm1+45° C. wherein Tm1 is the melting temperature of the semi-crystalline polymer). For example, if the polymer is polyethylene, the selected temperature is 190° C. If the polymer is polypropylene, the temperature is 230° C. If the polymer is polylactic acid, the temperature is 200° C. The person skilled in the art will select the temperature for determining the MFI of the polymer according to ISO 1133 without any difficulty.

The high load melt flow index (HLMI) was determined under a load of 21.6 kg at a temperature of 190° C. for polyethylene, of 230° C. for polypropylene and of 200° C. for polylactic acid according to ISO 1133. The person skilled in the art will select the temperature for determining the HLMI of the polymer according to ISO 1133 without any difficulty.

The agglomerate area fractions (U %) is determined in accordance with ASTM D2663-14.

The melting temperature is determined in accordance with ISO 11357-3:2013

The volatile organic compound content is determined in accordance with ISO 11890.

Example 1

The first semi-crystalline polymer used consists of polyethylene copolymer with a melt index (MI2) of 16 g/10 min as measured according to ISO1133 (190° C.-2.16 kg) and a melting temperature of 119° C. The polyethylene (90 wt %) was melt blended with 10 wt % of carbon nanotubes by extrusion at screw speed of 500 rpm. A masterbatch M1 according to the present invention was prepared by extrusion at a temperature within the transport and melting zone of the extruder of 150° C. while a comparative masterbatch CM1 was prepared at a temperature within the transport and melting zone of the extruder of 250° C. The high load melt index of the masterbatch M1 according to the present invention so-produced was of 24.3 g/10 min.

Example 2

Example 1 is repeated with the exception that the first semi-crystalline polymer was polypropylene homopolymer having a melt flow index of 60 as determined at a temperature of 230° C. under a load of 2.16 kg to form an inventive masterbatch M2, and having a melt flow index of 1.8 as determined at a temperature of 230° C. under a load of 2.16 kg to form a comparative masterbatch CM2. The melting temperature of the polypropylene was 163° C. The temperature within the transport and melting zone of the extruder used for the extrusion of masterbatch M2 and CM2 according to the present invention was 180° C. The properties of the resulting composite material are detailed in table 1 below.

TABLE 1 composition of masterbatches and properties thereof

| Masterbatch | M1 | CM1 | M2 | CM2 |
|---|---|---|---|---|
| First polymer | Polyethylene | Polyethylene | Polypropylene | Polypropylene |
| Content of polymer (wt %) | 90 | 90 | 90 | 90 |
| CNT (%) | 10 | 10 | 10 | 10 |
| Melt flow index of the polymer | 16 | 16 | 60 | 1.8 |
| HLMI of the masterbatch | 24.3 | 23.2 | 612.0 | 42.7 |

Example 3

The masterbatchs of examples 1 and 2 were used in the preparation of a composite material E1, E2, CE1 and CE2. The masterbatch and a second polymeric composition was melt blended in amounts such that the composite material contains 1 wt % of carbon nanotubes.

A composite material E1 was prepared from the masterbatch M1 and a comparative composite material CE1 was prepared from the comparative masterbatch CM1. For both composite material 90% of polyethylene having a melt flow index of 6 g/10 min determined at 190° C. under a load of 2.16 kg according to ISO 1133 and a Tm of 119° C., was used. The polyethylene and the masterbatch were extruded at a temperature within the transport and melting zone of the extruder of 220° C.

The composite material (E2 and CE2) prepared from masterbatches M2 and CM2 were blended with a second polypropylene having MFI of 12 g/10 min and a melting temperature of 163° C. The polypropylene and the masterbatch were extruded at a temperature within the transport and melting zone of the extruder of 230° C.

The properties of the resulting composite material are detailed in table 2 below.

TABLE 2 composition of composite material, and properties thereof

| | Composite material | | | |
|---|---|---|---|---|
| | E1 | CE1 | E2 | CE2 |
| Masterbatch used | M1 | CM1 | M2 | CM2 |
| Second polymer | Polyethylene | Polyethylene | Polypropylene | Polypropylene |
| MFI of second polymer | 6 | 6 | 12 | 12 |
| SR (ohm/sq) | $1.5*10^3$ | $1.1*10^3$ | $5.0*10^3$ | $2.0*10^7$ |
| U (%) | 0.43 | 2.67 | 0.57 | 2.00 |

As can be seen in table 2, composite material E1 made of masterbatch M1 prepared according to the present invention, i.e. at low temperature within the transport and melting zone of the extruder, shows excellent surface resistivity but also shows low agglomerate area fraction which means that the carbon nanotubes are well dispersed within the polymer phase of the composite material. By contrast, the composite material CE1 prepared with comparative masterbatch CM1 shows greater agglomerate area fraction which leans that the carbon nanotube forms more agglomerates within the polymer phase.

The composite material E2 made of masterbatch M2 prepared according to the present invention, i.e. using at low temperature within the transport and melting zone of the extruder using polypropylene with adequate melt flow index, shows excellent surface resistivity but also shows low agglomerate area fraction which means that the carbon nanotubes are well dispersed within the polymer phase of the composite material. By contrast, the composite material CE2 prepared with comparative masterbatch CM2 shows greater agglomerate area fraction which leans that the carbon nanotube forms more agglomerates within the polymer phase.

What is claimed:

1. A composite material, the composite material comprising a blend of:
    a masterbatch comprising a blend of a first semi-crystalline polymer having a melting temperature Tm1 as measured according to ISO11357-3, with carbon nanotubes, wherein the carbon nanotubes content being of at least 5 wt % of carbon nanotubes based on the total weight of the masterbatch as determined according to ISO11358, the masterbatch having a high load melt index HLMI ranging from 100 g/10 min to 1000 g/10 min as determined according to ISO1133 under a load of 21.6 kg;
    characterised in that the first semi-crystalline polymer is selected from syndiotactic polypropylene and isotactic polypropylene; and
    a second semi-crystalline polymer, wherein the carbon nanotubes are from 0.9 wt % to 1.1 wt, of the total weight of the composite material as determined according to ISO11358, wherein the second semi-crystalline polymer is selected to be miscible with the first semi-crystalline polymer, to have a melting temperature Tm2 ranging from Tm1−5° C. to Tm1+5° C. and to have a melt flow index of not more than 20 g/10 min as determined under a load of 2.16 kg according to ISO1133, and the composite material has:
    an agglomerate area fraction U % lower than 2%, as determined in accordance with ASTM D-2663-14, a surface resistivity lower than $10^5$ ohm/sq, as determined according to CEI60167.

2. A a composite material, composite material comprising a blend of:
a masterbatch comprising a blend of a first semi-crystalline polymer having a melting temperature Tm1 as measured according to ISO11357-3, with carbon nanotubes, wherein the carbon nanotubes content being of at least 5 wt % of carbon nanotubes based on the total weight of the masterbatch as determined according to ISO11358, the masterbatch having a high load melt index HLMI ranging from 2 g/10 min to 1000 g/10 min as determined according to ISO1133 under a load of 21.6 kg;
characterised in that the first semi-crystalline polymer is polyethylene; and
a second semi-crystalline polymer wherein the carbon nanotubes are from 0.9 wt. % to 1.1 wt % with respect to the total weight of the composite material as determined according to ISO11358, wherein the second semi-crystalline polymer is selected to be miscible with the first semicrystalline polymer, to have a melting temperature Tm2 ranging from Tm1−5° C. to Tm1+5° C. and to have a melt flow index of not more than 20 g/10 min as determined under a load of 2.16 kg according to ISO1133 and the composite material has:
an agglomerate area fraction U % lower than 2%, as determined in accordance with ASTM D-2663-14,
a surface resistivity lower than $10^5$ ohm/sq, as determined according to CEI60167.

3. The masterbatch according to claim 2 characterized in that the HLMI of the masterbatch ranges from 10 to 100 g/10 min as determined according to ISO1133 under a load of 21.6 kg at a temperature of 190° C.

4. The masterbatch according to claim 2, characterised in that the first semi-crystalline polymer has a melt flow index ranging from 5 to 250 g/10 min as measured according to ISO 1133 under a load of 2.16 kg.

5. The masterbatch according to claim 2, characterised in that the masterbatch comprises from 0.01 to 4.0 wt % of one or more additives based on the total weight of the masterbatch, the one or more additives being selected from waxes, tristearin, zinc stearate, calcium stearate, magnesium stearate, erucyl amide, oleic acid amide, ethylene-acrylic acid copolymer, ethylene vinyl acetate copolymer and cetyl trimethyl ammonium bromide.

\* \* \* \* \*